Aug. 12, 1941.  E. MORRIS ET AL  2,252,022
HIGHWAY LIGHTING SYSTEM
Filed Aug. 18, 1939
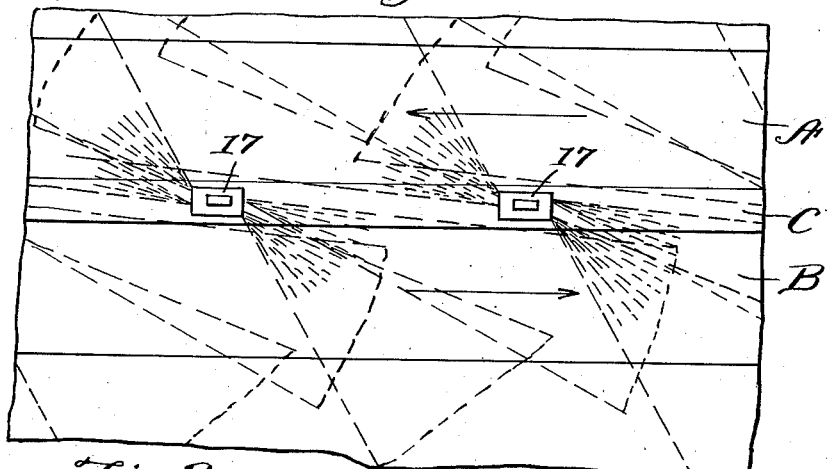
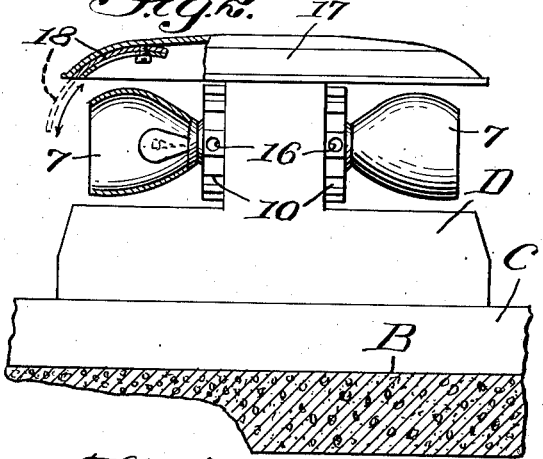
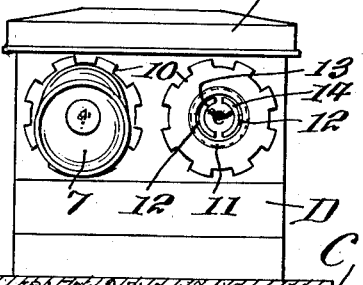
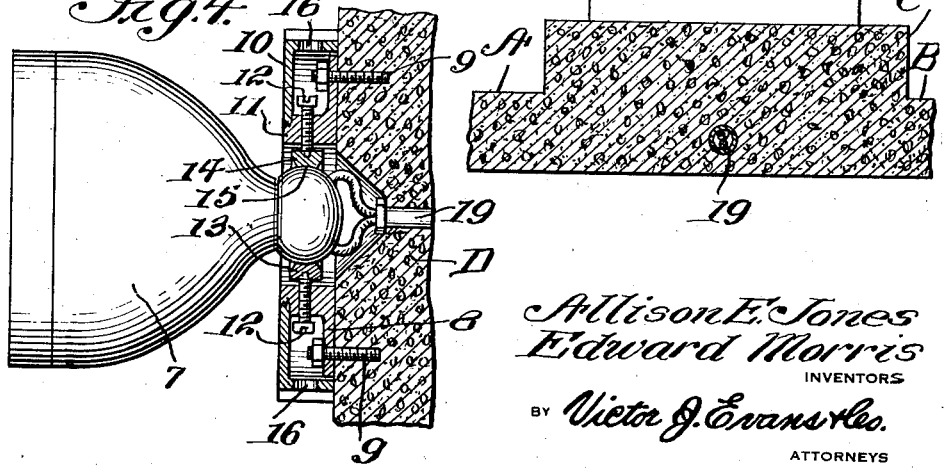
Allison E. Jones
Edward Morris
INVENTORS
BY Victor J. Evans & Co.
ATTORNEYS Patented Aug. 12, 1941

2,252,022

UNITED STATES PATENT OFFICE 2,252,022

HIGHWAY LIGHTING SYSTEM

Edward Morris and Allison E. Jones, San Jose, Calif.

Application August 18, 1939, Serial No. 290,915

3 Claims. (Cl. 240—25)

This invention relates to improvements in highway lighting systems and has particular reference to a novel and unique lighting arrangement, whereby the difficulty of road illumination can be overcome by transposing or transferring the illumination means from the moving vehicle to a series of fixed, spaced lamps positioned on a raised center of a divided highway.

It is a well-known fact that confusion and resulting accidents are caused by the headlights of rapid moving vehicles, from which lights project glaring beams annoying to other drivers. Furthermore, inadequate highway lighting, augmented by the said headlight glare, causes numerous accidents and often fatalities. However, with a fixed highway light, the pavement and objects on the roadway are readily seen by a combination of direct reflection and silhouette.

It is, therefore, an additional object of our invention, by virtue of our novel mounting of the lamp standards and the construction of the same, to eliminate glare, to produce excellent visibility, and to provide a most economical and efficient lighting arrangement.

Other objects and advantages will be apparent during the course of the following description.

In the accompanying drawing forming a part of this specification and in which like numerals are employed to designate like parts throughout the same, Fig. 1 is a fragmentary plan view of a divided highway with the respective highways being indicated by the arrows and the central strip representing a raised curb;

Fig. 2 is a side elevation of one of the standards with a portion of the hood being broken away and shown in section;

Fig. 3 is a front elevation of the standard illustrated in Fig. 2, with one lamp and reflector being removed from the right-hand socket; and Fig. 4 is an enlarged detailed view illustrating to advantage the method of mounting the adjustable socket type of reflector.

In the accompanying drawing wherein for the purpose of illustration is shown a preferred embodiment of our invention, the reference characters A and B designate adjacent highways in which there is employed a raised central curb C. In Fig. 1 there is illustrated to advantage dash lines that indicate the paths of light rays that serve to illuminate the paths of travel in both directions. It will be noted that the lamps or illuminators are set at positions which will prevent light rays from shining in the eyes of an operator of a vehicle travelling toward the standards D, upon which the lamps are mounted. It is to be further observed that when approaching from either direction, the light rays are projected along the path of travel in the same direction as a moving vehicle and do not shine into the eyes of the operator of said vehicle. This illuminating means floods the highway with light but does not direct any light rays into the eyes of the operator of any vehicle travelling along this type of divided highway.

Referring to the type of lamps and standards employed in carrying out our invention, we have illustrated in the enlarged detailed view of Fig. 4 the method of mounting the adjustable socket type of reflector 7. Mounted against the outer faces of the standards (only one being shown in Fig. 4) are a plurality of flanges 8 that are bolted to the standards by means of studs 9 embedded in the structure. The outer end of the central portion of each flange is stepped down and is threaded to receive a castellated nut 10, which is so formed that it completely covers the flange 8 and the nuts on the studs 9.

Mounted on opposite sides of a neck 11 is a pair of set screws 12 that separately support ring segments 13 and 14 positioned within the neck of said flange. The inner periphery of the ring segments 13 and 14 is shaped to fit the outer surface of the socket portion of the reflector 7, as indicated by the numeral 15. A recess is provided directly behind the center of the flange 8 to permit space for the electrical wiring connections.

When it is desired to either adjust the position of the reflector 7 or to remove it for service purposes, a screw driver is inserted through the holes 16 in the castellated nut 10, and the set screws 12 are slightly turned to release the grip of the ring segments on the socket of the reflector 7. The reflector may then be turned to any desired position and set screws retightened to hold said reflector at the selected point.

It will be noted that the castellated nut 10 acts as a weather protective means for the assembled parts within it and also serves to prevent tampering with the position adjustment screws of the device by unauthorized persons.

It is to be observed that it is possible to remove a reflector from the device without disturbing the castellated nut 10 and the flange 8 by simply turning back the set screws 12 far enough to permit the ring segments 13 and 14 sufficient latitude to allow the passing of the head of the socket of the reflector. This type of assembly permits a convenient means for servicing of the light reflectors. It is to be especially noted that the shape of the reflector is such that the light rays, as illustrated in Fig. 2, are directed downwardly at all times on to the pavement of the highway where they are of the most practical use.

In Fig. 2 we have illustrated the hood 17 as partly broken away so that one of the visors 18, mounted within either end of the hood 17, can be lowered to additionally shield the light rays from the eyes of the operators of approaching vehicles. It is to be observed that this shield is used only when one of the standards is mounted on the brow of a hill so as to provide means for additionally deflecting the light rays downwardly on to the highway.

The numeral 19 designates a conduit that is provided in the center of the highway for the purpose of conducting electric current to the various standards.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. In a highway lighting system, the combination with a highway having a raised central portion, standards rigidly mounted on said raised portion and having oppositely facing sides substantially perpendicular to the center line of the highway, plates secured on said sides of the standards and having an outwardly extending flange, combined bulb socket and reflectors having spherical inner ends within the flanges, set screws radially adjustable in said flanges and adapted to engage the spherical inner ends of the combined bulb socket and reflectors, and a cover plate on said flanges and removably supported thereby.

2. In a highway lighting system, the combination with a highway having a raised central portion, standards rigidly mounted on said raised portion and having oppositely facing sides substantially perpendicular to the center line of the highway, plates secured on said sides of each of the standards and each plate having an outwardly extending flange, combined bulb socket and reflectors having spherical inner ends within the flanges, set screws radially adjustable in said flanges and adapted to engage the spherical inner ends of the combined bulb socket and reflectors, and a castellated nut screwed on the outer end of each of said flanges and having openings, whereby the set screws may be adjusted for adjusting the reflector by passing a screw driver through said openings.

3. In a highway lighting system, the combination with a highway having a raised central portion, standards rigidly mounted on said raised portion and having oppositely facing sides substantially perpendicular to the center line of the highway, plates secured on said sides of each of the said standards, an outwardly extending flange carried by each plate, combined bulb and socket and reflectors having spherical inner ends within the flanges and adapted to be locked in their adjusted position by radially extending set screws carried by the flanges, a castellated nut screwed on the outer end of each of said flanges and having openings in their outer peripheries, a curved hood carried by the upper end of the standard and extending over both of the reflectors, and a curved visor carried by the under side of the hood at each end above the reflectors and adapted to be extended outwardly and downwardly over the same.

EDWARD MORRIS.
ALLISON E. JONES.